INVENTOR.
Aurelius Chaves Jr.
William C. Moog Jr.
BY Popp and Sommer
ATTORNEYS.

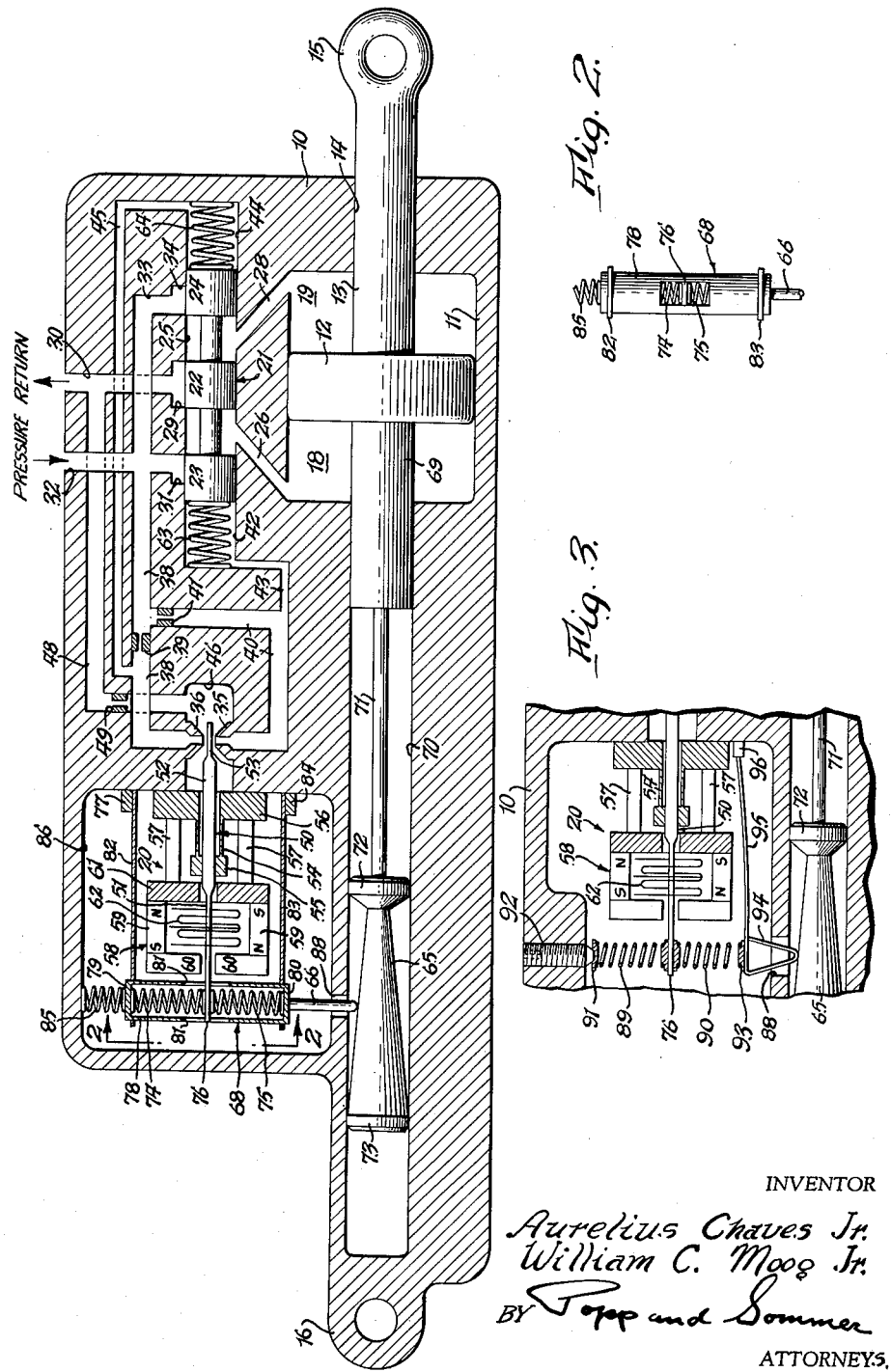

United States Patent Office 3,065,735
Patented Nov. 27, 1962

3,065,735
SERVOACTUATOR
Aurelius Chaves, Jr., Lancaster, and William C. Moog, Jr., East Aurora, N.Y., assignors to Moog Servocontrols, Inc., East Aurora, N.Y., a corporation of New York
Filed Nov. 22, 1960, Ser. No. 70,999
7 Claims. (Cl. 121—41)

This invention relates to improvements in a servoactuator or power control unit of the type having an electrohydraulic servovalve controlling the actuation of an hydraulic servomotor or actuator the movable element of which, such as the piston of a cylinder-piston assembly, is connectable to the load for driving the same. Electrical signals to the servovalve produce flow of fluid under pressure to the said movable element which drives the load.

In a conventional feedback control system, load motion is measured electrically and fed back to an error detecting device for comparison with a command signal representing the desired load motion. Any resulting error signal is amplified to provide electrical inputs to the servovalve.

In contrast to the above-described servo system and in accordance with the present invention, mechanical feedback means are operatively interposed between the servovalve and the movable element of the hydraulic servomotor or actuator so that a feedback force proportionate to the extent of movement of said element is developed which works in opposition to the force induced by the command electrical signal input and counteracts the same when said element has moved a sufficient amount to a displaced position whereby the extent of movement of said element is proportionate to said command signal.

Accordingly, the primary object of the present invention is to provide a mechanical feedback servoactuator as a complete, self-contained servo system which accepts an electrical command input and furnishes a proportionate mechanical displacement output. When appropriately connected to a load, the servoactuator will position the load directly without the need for an electrical transducer and servoamplifier which are used in conventional electrohydraulic servo systems.

Other objects and advantages of the invention will be apparent from the following detailed description thereof and the accompanying drawings wherein:

FIG. 1 is a central longitudinal sectional view of a diagrammatic type, taken through a servoactuator embodying the preferred form of the present invention.

FIG. 2 is a fragmentary sectional view thereof taken on line 2—2, FIG. 1.

FIG. 3 is a fragmentary sectional view similar to FIG. 1 and showing a modified form of mechanical feedback means.

FIG. 1

Figure 4:
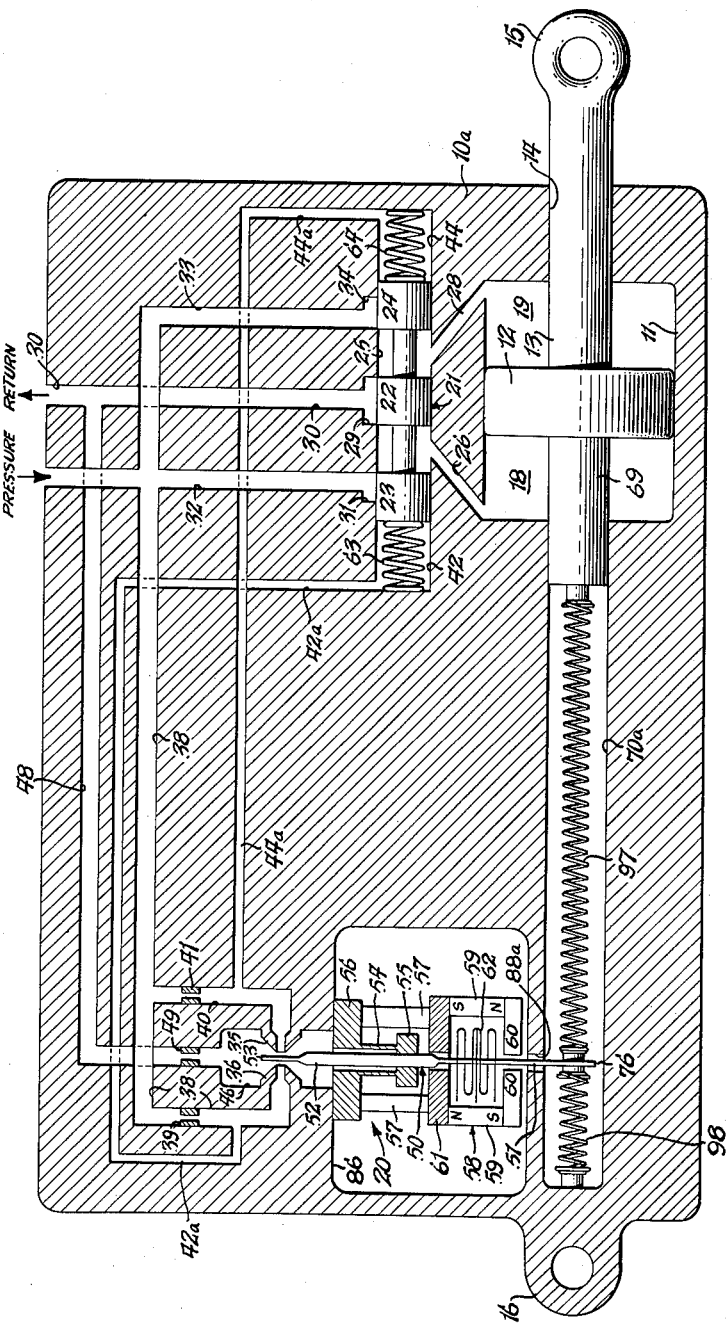
FIG. 4 is a central longitudinal sectional view of a servoactuator embodying still another modified form of mechanical feedback means.

Referring to the preferred form of the invention illustrated in FIG. 1, the servoactuator is shown as comprising a body member 10 internally formed to provide a cylinder or compartment 11 in which a power piston 12 is slidably arranged. Connected to the piston 12 is a rod 13 which extends outwardly through a hole 14 provided in the end wall of the body so that the outer end of this rod is arranged exteriorly of the body. The outer extremity of the piston rod 13 is shown as formed to provide an eye 15. Arranged in axial alinement with the piston rod 13 is an eye 16 formed on the body 10 and on the side thereof opposite from where the piston rod 13 projects outwardly from the body 10. The eyes 15 and 16 or equivalent means adapt the servoactuator for connection operatively between some reference structure (not shown) and some load (not shown). By introducing fluid under pressure selectively to either of the chambers 18 or 19 provided on opposite sides of the piston 12, the piston rod 13 can be caused to move either inwardly or outwardly and thereby adjust the distance between the eyes 15 and 16.

Electrically operated valve means are provided for controlling the flow of fluid to and from the chambers 18 and 19. Such means are shown as comprising a first-stage hydraulic amplifier indicated generally at 20 and an output stage sliding valve 21.

The valve 21 is shown as a cylindrical spool having an enlarged central lobe or land 22 and similar lands or lobes 23 and 24 at opposite ends and spaced axially from the central lobe. The valve spool 21 is slidably arranged in a cylindrical compartment 25 suitably formed within the body 10. The space between the lobes 22 and 23 of the valve spool is in constant communication with the left hand cylinder chamber 18 via a passage 26. The space between the lobes 22 and 24 is in constant communication with the right hand cylinder chamber 19 via the passage 28. When the valve spool 21 is in a null position as shown in FIG. 1, the central land 22 closes off a drain port 29 which a passage 30 connects to a fluid reservoir or sump (not shown). The left hand end lobe 23 of the valve spool 21 when in a null position closes off a metering port 31 which communciates via the passage 32 with a source of pressurized fluid (not shown). Connected to the pressure supply passage 32 is a branch passage 33 which leads to a second metering port 34 arranged to be closed by the right hand end lobe 24 of the valve spool 21 when the latter is in its null position.

It will thus be seen that if the valve spool 21 is displaced to the right of its null position, metering port 34 will be uncovered by lobe 24 so as to permit fluid under pressure to pass through the space between the lobes 22 and 24 through the passage 28, and into the right hand power cylinder chamber 19. Simultaneously, the central lobe 22 will uncover the drain port 29 so as to place the left hand power cylinder chamber 18 into communication with the hydraulic system drain through the passage 26, the space between the lobes 22 and 23, the uncovered drain port 29 and the drain passage 30. Thus, the power piston 12 can be driven hydraulically toward the left as viewed in FIG. 1.

On the other hand, if the valve spool 21 is displaced to the left, lobe 23 uncovers metering port 31 so as to supply fluid under pressure into the space between the lobes 22 and 23 from whence it flows through the passage 26 into the power chamber 18. Simultaneously, the central lobe 22 will uncover the drain port 29 so as to connect the right hand power cylinder chamber 19 via the passage 28, the space between the lobes 22 and 24, with the drain passage 30. With such a displacement of the valve spool to the left of its null position, the power piston 12 will be driven hydraulically toward the right.

In response to an electrical command input, the first-stage hydraulic amplifier 20 provides a pressure differential which is utilized to drive the valve spool 21 in the manner now to be described. This amplifier is shown as including a pair of fixed and spaced nozzles 35 and 36. These nozzles are shown arranged opposingly so as to discharge fluid toward each other. The fluid discharged by the nozzle 36 is supplied by a branch passage 38 connected at one end to the pressure supply passage 32 and at its other end to the discharge opening or aperture in the end of this nozzle. A restriction 39 is arranged within the branch passage 38. Fluid is supplied to the other nozzle 35 through a branch passage 40 connected at one end to the branch passage 38 on the upstream side of the restriction 39, and at its other end to the discharge opening or aperture of this nozzle. A restriction 41 is arranged in the branch passage 40. The branch passage 40 downstream of the restriction 41 therein is shown as communicating with the left hand spool end chamber 42 via a conduit 43. The right hand spool end chamber 44 is shown as communicating with the branch passage 38 on the downstream side of the restriction 39 therein via the conduit 45.

The nozzles 35 and 36 discharge fluid into a sump chamber 46 suitably formed as a recess within the body 10. This sump chamber 46 is shown as communicating with the drain passage 30 via a drain conduit 48 in which restriction 49 is shown as arranged. The purpose of this restriction 49 is to reduce surging in the sump chamber 36.

Another important element of the first-stage hydraulic amplifier 20 is a movable rigid pressure regulator member or armature-flapper member 50 having a flat armature part 51 and a cylindrical flapper part 52. The outer extremity of the flapper part 52 is shown as formed to provide a flat and parallel-sided tip 53 which is arranged between the nozzles 35 and 36. The armature-flapper member 50 is shown as being pivotally mounted so that when moved the tip portion 53 is arranged to move closer to one nozzle while moving farther away from the other nozzle and vice versa. For this purpose, the armature-flapper member 50 is pivotally supported on a flexure tube 54, the axis of pivotal movement being intermediate the ends of this tube. This flexure tube is a relatively thin-walled cylindrical tube which surrounds an intermediate cylindrical portion of the flapper part 52 of the armature-flapper member and is spaced therefrom. One end of this flexure tube 54 has an inwardly and outwardly enlarged collar 55 which is suitably connected in a fluid sealed manner to the armature-flapper member 50. The other end of the flexure tube 54 is shown as provided with an enlarged outwardly extending annular attaching flange 56 which is held by suitable fastening means (not shown) to the body member 10. It will be noted that the base or attaching flange 56 of the flexure tube partially covers what would otherwise be the open end of the recess which forms the sump chamber 46. However, the annular clearance between the inner surface of the flexure tube 54 and the external surface of the portion of the armature-flapper member within this flexure tube is in fluid communication with the sump chamber 46. The fluid-sealed connection at the flexure tube collar 55 serves to isolate the fluid section including the nozzles 35, 36 and flapper 52 from a dry section including a torque motor 58.

The torque motor 58 supported on suitable members 57, 57 carried by the body member 10 is shown as comprising a pair of permanent magnets 59, 59 arranged with opposite poles at the corresponding end and severally in contact with a pair of spaced pole pieces 60, 60 arranged at one end of the permanent magnets. The opposite ends of these magnets are shown as arranged severally in contact with a shunt plate 61 having a central opening. The flat armature part 51 of the armature-flapper member 50 extends through such opening and through the air gap provided between the pole pieces 60. The plane of the flat armature part 51 is parallel to the end faces of the pole pieces 60.

Electromagnetic means are also associated with the pole pieces 60. Thus the armature part 51 is shown as surrounded by a coil 62 having end leads and preferably a lead from a center tap whereby differential currents can be fed into the coil to produce the desired resultant electromagnetic effect upon the armature member 51, all as well understood by those skilled in the electrohydraulic servo art.

At this point, it will be observed generally that if the coil 62 receives a current input, a torque upon the armature-flapper member 50 will be induced causing the tip portion 53 of the flapper to move closer to one of the nozzles 35 or 36, depending upon the sense of the electrical input, while moving farther away from the other nozzle. Assuming, for example, that the electrically induced torque is effective so as to pivot the armature-flapper member 50 in a clockwise direction as viewed in FIG. 1 whereby the tip portion 53 is moved downwardly closer to the lower nozzle 35 and farther away from the upper nozzle 36, the pressure of the fluid upstream of the nozzle 36 in the branch passage 40 will increase while the pressure of the fluid upstream of the nozzle 36 in the branch passage 38 will decrease. The conduits 43 and 45 sense this pressure differential and apply it to opposite ends of the valve spool 21, with the conduit 43 sensing the higher pressure and the conduit 45 sensing the lower pressure, in the assumed example. With this pressure differential present in the spool end chambers 42 and 44, the spool will be hydraulically driven from left to right. In this connection, a centering spring 63 is arranged in the spool end chamber 42 and a similar return spring 64 is arranged in the right hand spool end chamber 44. These return springs 63 and 64 maintain the valve spool 21 in its null position when the valve spool is not acted upon by a pressure differential present in the spool end chambers. However, in the assumed situation, the higher hydraulic force is present in the left hand spool end chamber 42 while the lower pressure is present in the right hand chamber 44. Thus, the valve spool will shift from left to right until a force balance is established with the return springs 63 and 64. When this force balance is achieved, the valve spool 21 will come to rest in some position displaced from null and in which fluid will be passed through the ports 29, 31 and 34 to and from the power cylinder 11 in the manner hereinabove described.

It is an important feature of the present invention to provide mechanical feedback means whereby a feedback force proportionate to the extent of displacement of power piston 12 will be applied to the armature-flapper member 50 to counterbalance the effect of the force on such member electrically induced as a result of the electrical command input fed into the coil 62. The form of the mechanical feedback means shown in FIG. 1 comprises a cam 65 connected to the power piston 12, a cam follower 66 engaging the cam 65, and feedback spring means indicated generally at 68 and operatively interposed between the armature-flapper member 50 and the cam follower 66.

More specifically, the side of the power piston 12 opposite from the piston rod 13 is shown as provided with an inner piston rod 69 which is cylindrical in cross-section having the same area as that for the outer piston rod 13. In this manner, the exposed opposite end faces of the power piston 12 are equal in area. This inner piston rod 69 is shown as slidably arranged within an elongated cylindrical bore 70 which communicates and is concentric with the cylinder 11. The end of the inner piston rod 69 remote from the power piston 12 is shown as provided with a central axial extension or stem 71 of reduced diameter which acts as a flexible rod. While the end of this flexible rod 71 remote from the piston rod 69 may be connected to any suitable type of cam member having an inclined cam face, this rod is shown as connected to a cam spool slidably arranged in the bore 70. This cam spool includes the aforementioned cam 65 which preferably has a frustoconical configuration arranged so that the small end is adjacent a first piston head 72 and the large end adjacent a second piston head 73. The piston head 73, cam 65, piston head 72, flexible stem 71, inner piston rod 69, power piston 12 and outer piston rod 13 are interconnected elements which move as a unitary structure. Thus, as the power piston 12 moves axially in its cylinder 11, the cam 65 is constrained to move a like amount in a coaxial direction.

The connection of the cam spool 65 to the piston 12 by the flexible rod 71 has an important practical advantage. It will be noted that the communicating cylindrical compartments 11 and 70 are relatively long from one extreme end to the other. Should the body 10 of the servoactuator flex about an axis transverse to the common longitudinal axis for these compartments 11 and 70, the flexible rod 71 which is flexible in this transverse direction will accommodate the body flexure. Thus the flexible rod 71 will bend as required to allow the cam spool 65 and power piston 12 to move in their respective cylinders without binding even though there is a tendency of the walls of the body 10 providing these cylinders to destroy their coaxial alinement, as may be occasioned by load on the actuator or temperature change or otherwise.

The feedback spring means 68 are shown as comprising a pair of similar helical compression springs 74 and 75 arranged respectively above and below an integral extension 76 formed on the outer end of the armature part 51 of the armature-flapper member 50. These feedback springs 74 and 75 are shown as housed in and carried by a vertically disposed tubular member 78 having closed upper and lower end walls 79 and 80, respectively. The cam follower 66 is fixedly connected to the lower end wall 80 as a downward projection therefrom. Centrally opposite side wall portions of the tubular member 78 are cut out to leave openings 81, 81 through which the armature extension 76 projects. Thus, the upper feedback spring 74 bears against the upper end wall 79 and the top of the armature extension 76, while the lower feedback spring 75 bears against the lower end wall 80 and the bottom of the armature extension 76.

The tubular member 78, which acts merely as a cage or carrier for the feedback springs 74 and 75, is suitably supported on the body member 10 and is free to move vertically but constrained against movement in other directions. For this purpose, a horizontally disposed flexible plate or leaf member 82 is suitably connected at its outer end to the upper end of the tubular member 78 and at its opposite end is suitably cantilever-mounted on the body member 10 as indicated at 77. A similar horizontally disposed flexible plate or leaf member 83 is connected to the lower end of the tubular housing 78 with the opposite end of this member 83 being suitably cantilever-mounted on the body member 10 as indicated at 84. A biasing spring 85 is shown as operatively arranged between the body member 10 and the upper end wall 79 of the feedback spring housing member 78. The purpose of this spring 85 is to urge the assembly of the housed feedback springs supported on the cantilever members downwardly so as to maintain the cam follower 66 constantly in engagement with the cam 65.

The body member 10 is provided internally with a compartment 86 in which the flexure tube 54, the torque motor 58, the feedback spring assembly 68 and associated elements, are housed. The cam follower 66 is shown as projecting through a hole 88 in a wall portion of the body member 10 separating the compartment 86 from the bore 70.

It is to be noted that the feedback springs 74 and 75 are operatively connected to the armature part 51 including its end extension 76 in juxtaposition to the gap between the pole pieces 60. This has a practical advantage. The magnetomotive effect, produced by the electromagnet coil 62 when energized, upon the armature part 51 is effective between the pole pieces 60 so as to apply a force upon the armature, either up or down, as later discussed. The force applied to the armature part by the feedback springs 74 and 75, generated in the manner later described, acts in the opposite direction. Thus the two oppositely directed forces acting upon the armature part 51 are applied thereto closely adjacent each other so as to minimize bending of the armature part.

Examining the armature-flapper member 50 further, it will be seen that it is subject to various forces, electrically, hydraulically and mechanically induced. Identifying these forces more specifically, the armature-flapper member 50 is subjected to an electrically induced force when the electromagnet coil 62 receives a current input. The direction in which this force is effective to pivot the armature-flapper will depend on the sense of the electrical input signal and the magnitude of the force will depend upon the strength of such signal.

Another force acting upon the armature-flapper member 50 is that due to bending of the flexure tube 54 and is mechanical in nature. This force has a rate, increasing with increased bending and vice versa. Therefore, the flexible support means provided by the flexure tube 54 provides a mechanical force effective upon the armature-flapper member 50 as a spring rate.

The variable orifices provided on opposite sides of the tip portion 53 of the armature-flapper member 50 in association with nozzles 35 and 36 produce a pressure differential. The resultant force effect of this pressure differential acting upon the armature-flapper member has a rate in the sense that the closer the flapper tip is to the nozzle, the higher will be the resultant force on the armature-flapper member 50, and vice versa. Thus, the armature-flapper member 50 is subject to the hydraulic spring rate of the double nozzle assembly.

Further, it will be seen that when the armature-flapper member 50 changes attitude, the feedback springs 74 and 75 are displaced thereby to provide a resultant force of a mechanical nature effective upon the armature-flapper member. This may be regarded as a spring rate of the feedback spring due to movement of the armature-flapper member 50 relative thereto.

It will be appreciated that the permanent magnets 59 produce a magnetomotive effect at the air gap between the pole pieces 60 which is operative to attract the armature-flapper member 50 when moved closer to the pole piece on one side of the armature portion 51 and farther away from the other pole piece on the other side. This is another force gradient affecting the armature-flapper member.

Finally, it will be seen that as the cam 65 is moved axially within its bore 70, the feedback springs 74 and 75 are operative to provide a feedback force effective upon the armature-flapper member 50 due to change in position of the back-up for these springs provided by changes in the position of the spring carrier 78.

A re-examination of the above-noted forces will show that the force gradient of the permanent magnets 59 is always effective to decenter the armature-flapper member 50. On the other hand, the respective forces applied to the armature-flapper member 50 by the spring rate of the flexure tube 54, the hydraulic spring rate of the nozzles 35 and 36 and the spring rate of the feedback springs 74 and 75 due to initial movement of the armature-flapper member relative thereto, are effective to center the armature-flapper member.

It is an important feature of the present invention that the decentering effect or force gradient of the permanent magnets 59 upon the armature-flapper member 50 is substantially counterbalanced by the combined centering effects or force gradients of the flexible support means provided by the flexure tube 54, the hydraulic reaction resulting from the pressure differential developed in the nozzles 35 and 36, and the deflection of the feedback springs 74 and 75 due solely to initial movement of the armature-flapper member. With this balance of centering and decentering spring effects, the armature-flapper member 50 is free to move in responses to any difference between the electrically induced forces and the feedback spring force due to motion of the cam 65. Such motion of the armature-flapper member 50 will cause corresponding displacement of the sliding valve spool 21 which will control the flow of hydraulic fluid with respect to the power cylinder chambers 18 and 19 in a manner so as to cause the desired axial displacement of the power piston 12.

In other words, the balance of the various aforementioned spring gradients acting upon the armature-flapper member 50 leaves it a freely movable member able to assume any position necessary to produce a balance between the input and feedback forces. The proportionality between position of the power piston 12 and the electrical input to the coil 62 is thereby achieved through action of the feedback springs which exert a force responsive to the extent of the movement of this piston.

*Operation of FIG. 1*

It is to be understood that the servoactuator is operatively interposed between a fixed member (not shown) and a movable member (not shown) which acts as the load. Suitable connection to these members is made through the eyes 15 and 16. Let it further be assumed that a source of fluid under pressure, such as the pump of a hydraulic supply system (not shown), is connected to the pressure supply passage 32, and also that the drain passage 30 is connected to the sump of such hydraulic system. Further, it is assumed that the various leads for the coil 62 are arranged to receive an electrical signal input which will energize this coil in the appropriate manner. These are all matters which will be understood by those skilled in the art.

We will begin with the servoactuator in the condition illustrated in FIG. 1. That is, the coil 62 is deenergized the valve spool 21 is in its null position, and the power piston 12 is in a substantially central position within its cylinder 11.

Let it now be supposed that a steady electric current is fed into the coil 62 to energize the same so as to attract electro magnetically the magnetically permeable armature part 51 upwardly thereby to pivot the armature-flapper member 50 in a clockwise direction as viewed in FIG. 1. As a result, the tip portion 53 of the flapper part 52 of the armature-flapper member 50 moves downwardly. This tends to shut off the lower nozzle 35 and open the upper nozzle 36. Thus, a pressure differential is developed in the spool end chambers 42 and 44, with the higher pressure being in the left hand chamber 42. This pressure differential drives the valve spool 21 to the right thereby introducing fluid under supply pressure into the right hand power cylinder chamber 19 and connecting the left hand power cylinder chamber 18 to drain. Under this pressure differential, the power piston 12 shifts to the left. In so moving, the cam 65 moves a like amount in the same direction and reduces the effective lift of the cam. The feedback spring assembly 68, to which the cam follower 66 is attached, is urged downwardly by the biasing spring 85 to maintain contact between the cam follower 66 and the cam 65. This downward translation of the feedback spring carrier 78 causes the springs 74 and 75 thereof to apply jointly a downward force upon the armature extension 76, tending to pivot the armature-flapper member 50 in a counterclockwise direction.

It will be seen that the power piston 12 will move toward the left as viewed in FIG. 1 until the cam 65 and cam follower 66 have positioned the feedback spring assembly 68 so that the feedback force exerted by the feedback springs 74 and 75 due to vertical relocation of their carrier 78 is such as to counterbalance the effect of the member. As the feedback force acting upon the armature-flapper member 50 increases in value to counteract the electrically induced force, the armature-flapper member is moved in a counter-clockwise direction and returned to its initial position. This has the effect of gradually reducing and ultimately eliminating the pressure differential generated by the nozzle and flapper assembly. Without a pressure differential present in the spool end chambers 42 and 44, the return springs 63 and 64 insuch chambers respectively become effective, and this occurs gradually as the pressure differential decreases, to return the valve spool 21 to its null position thereby closing off the ports 29, 31 and 34. Closing these ports stops movement of the power piston 12 which is thereupon left in a position displaced from its starting position by an extent of movement proportionate to the strength of the electric current input to the coil 62.

Thus, with a steady current input to the coil 62 the torque generated thereby upon the armature-flapper member 50 is counterbalanced by the torque on this member developed by the feed-back spring assembly 68.

If now the current input to the coil 62 is reduced, eliminated or changed in sense so that the force exerted by the feedback springs 74 and 75 upon the armature-flapper member 50 is such as to move that member about its pivotal axis in a counterclockwise direction, it will be seen that the tip portion 53 of the flapper part will tend to close off the aperture for the upper nozzle 36 while opening that for the lower nozzle 35. This develops a pressure differential in the spool end chambers 42 and 44, with the higher pressure in the right hand chamber 44. The valve spool 21 is thus hydraulically driven to the left from its null position, thereby placing left hand power cylinder chamber 18 in communication with supply pressure and right hand power cylinder chamber 19 in communication with the drain. As a consequence, the power piston 12 is driven to the right. This also moves the cam 65 to the right causing the cam follower 66 to raise the feedback spring assembly 68, thus reducing the amount of spring feedback force or changing the direction of its application to the armature-flapper member 50.

*FIG. 3*

The modified form of mechanical feedback means shown in FIG. 3 is similar to that just described with respect to including the cam 65 connected by the stem 71 to the power piston 12, the latter not being shown in FIG. 3. The only changes in the construction shown in FIG. 3 over that shown in FIG. 1, relate to the feedback and biasing spring means. Referring to FIG. 3, the armature-flapper member 50 has arranged above it a biasing spring 89 and below it a feedback spring 90. These springs at one end bear against the extension 76 on the outer end of the armature part of the member 50. The upper end of the biasing spring 89 is shown as bearing against an adjustable seat 91 which is backed up by an adjustable screw 92 threaded into a hole provided in a wall portion of the body member 10. The lower end of the feedback spring 90 is shown as bearing against a seat 93 carried on the upper end of a cam follower 94. This cam follower is formed by bending a strip of flexible sheet metal into a triangular tube at one end so as to form a rounded nose which engages the cam surface of the cam 65. The base of the triangular nose is continued to provide a leaf spring 95 secured at its end to the body member 10 as indicated at 96. The inherent resiliency of the leaf spring 95 provides the downward bias on the cam follower 94 urging the same into constant engagement with the cam 65. The purpose of the adjusting screw 92 is to vary the preload in springs 89 and 90 and thereby adjust the neutral position of the armature-flapper member 50.

Except for these changes, the operation of a servoactuator embodying the feedback means illustrated in FIG. 3 is similar to that described in connection with the servoactvuator shown in FIG. 1. Similar reference characters have been used to indicate identical parts.

*FIG. 4*

The difference between the still further modified form of servoactuator shown in FIG. 4 as compared with the servoactuators shown in FIGS. 1 and 3, resides essentially in the mechanical feedback means operatively interposed between the armature-flapper member 50 and the power piston 12. In FIG. 4 the first-stage hydraulic amplifier 20 is illustrated in a differently oriented position so that the armature-flapper member 50 extends generally vertically instead of horizontally as in the case of FIGS. 1 and 3. Here again, like parts will be indicated by similar reference characters.

Before considering the different mechanical feedback means shown in FIG. 4, it is to be noted that the connections between the spool end chambers 42 and 44 are reversed in FIG. 4 as compared with FIGS. 1 and 3. Thus, the left hand spool end chamber 42 shown in FIG. 4 is connected via the conduit 42a with the portion of the passage 38 between the restriction 39 therein and the nozzle 36. The right hand end spool chamber 44 is connected via the conduit 44a with the portion of the passage 40 intermediate the restriction 41 and the other nozzle 35.

The chief modification in FIG. 4 is the elimination of the cam and cam follower elements and the substitution of a feedback spring 97 operatively between the extended end 76 of the armature part 51 of the member 50 and the power piston 12. More specifically, the armature part 51 extends through a hole 88a in the body member 10a and the armature end portion 76 projects into the bore 70a provided in the body. The left hand end of the feedback spring 97 is suitably connected to the armature extension 76 and the right hand end of this spring is suitably fastened to the end of the inner piston rod 69 for the power piston 12. A biasing spring 98 is shown as being operatively arranged between the end wall of chamber 70a and the side of the armature extension 76 opposite from the feedback spring 97.

Assuming the various parts to be in the condition shown in FIG. 4 and further assuming a steady current input is then applied to the torque motor 58 and of a sense to induce a torque urging the armature-flapper member 50 to rotate in a clockwise direction, it will be seen that the tip portion 53 of the flapper tends to shut off the nozzle 35 while opening the nozzle 36. The pressure differential thus developed is applied to the opposite ends of the valve spool 21, with the higher pressure being in the right hand end spool chamber 44 while the lower pressure is in the left hand end spool chamber 42. The valve spool 21 is thus hydraulically driven from its null position to the left permitting pressurized fluid to enter the left hand power cylinder chamber 18, and connecting the right hand power cylinder chamber 19 to drain. This hydraulically drives the power piston 12 to the right as viewed in FIG. 4 thereby stretching the feedback spring 97. Such additional stretching of this feedback spring causes the same to apply a feedback force upon the armature flapper member 50 in a direction causing the same to pivot in a counterclockwise direction. When the power piston 12 has been displaced a sufficient distance to permit the feedback spring 97 to generate a force sufficient to counteract the effect of the electrically induced force acting in the opposite direction, the armature-flapper member 50 is restored to a central position between the nozzles 35 and 36. This eliminates the pressure differential acting upon the ends of the valve spool 21 and thereby allows the valve spool to return to its null position under the urging of the return springs 63 and 64. This return of the valve spool 21 terminates the flow of fluid to and from the chambers 18 and 19 of the power cylinder 11, thereby bringing the power piston 12 to rest in a position different from its starting position and displaced therefrom by a distance proportional to the strength of the electrical current input to the coil 62 of the torque motor 58.

In comparing the several embodiments of the present invention illustrated, it will be noted that there is no motion reduction in the feedback means illustrated in FIG. 4, as there is through the use of a cam and follower illustrated in FIGS. 1 and 3. Typically the feedback spring 97 of the form shown in FIG. 4 might vary the force applied to the armature-flapper member 50 within about one pound for several inches of power piston motion.

The cam 65 of the forms shown in FIGS. 1 and 3 acts as a motion reduction device which permits the use of a much stiffer spring. Thus for several inches of power piston motion the cam 65 may only produce a cam lift or fall of one-tenth inch. A spring producing a change of force of about one pound for a one-tenth inch deflection is therefore much stiffer. Accordingly, while the form shown in FIG. 4 is simple and therefore desirable, it has the disadvantage of requiring a long, weak feedback spring which is difficult to support and has a low resonant frequency, whereas the feedback springs in the forms shown in FIGS. 1 and 3 can be comparatively stiff and will have a high natural frequency.

Still further, the feedback spring means shown in FIG. 1 has advantages over the corresponding means shown in FIG. 3. Besides being more symmetrical, the arrangement shown in FIG. 1 using two feedback springs 74 and 75 permits a more convenient selection of these springs to provide the desired effective feedback spring rate which must be selected to give the overall servo-actuator sensitivity which is a proportionality constant between output, measured in inches of power piston displacement, to electrical input, measured in milliamperes. Typically, servo-actuators including two feedback springs 74 and 75 as shown in FIG. 1 can be consistently constructed to have a senisitivity closer than 5% of the desired value. This is due to selecting two springs having different spring rates and combining them to provide the effective spring rate desired. As a practical matter, it is difficult to manufacture springs which are supposed to be identical to have the same spring rates. Rather than discard those springs varying from the desired norm, a low variant can be combined with a higher variant spring, or otherwise combined, to provide the effective spring rate desired. These practical considerations pertain to the feedback spring arrangement shown in FIG. 1.

Instead of the dry torque motor construction illustrated and described herein, a wet motor design such as shown in United States Patent 2,767,689 may be employed where the advantages of the dry motor design are not required. Also, other suitable types of electrically operated valving means may be used. For example, a three-stage flow control servovalve means may be advantageously incorporated into a servoactuator where power amplification is desired, or a flow control servo valve in which the valve spool is positioned not by a force balance between spool end springs and a pressure differential but by a torque balance on the armature-flapper member produced by a mechanical feedback force from the valve spool and the electrically induced force, or a pressure-flow servo valve in which valve spool displacement is controlled jointly by the electrical signal input and by the load reaction which contributes effective damping in dynamically loaded servo systems, or a dynamic pressure feedback servovalve which has high frequency pass load pressure feedback to provide damping while retaining the desired servo system static stiffness characteristics of non-load-pressure sensitive servovalves.

It will be appreciated that in an actual commercial embodiment of a servoactuator constructed in accordance with the principles of the present invention, suitable filter means (not shown) are interposed in certain fluid conduits to maintain the fluid discharged by the nozzles 35 and 36 in a condition free from deleterious foreign particles. Further, various structural elements are more complicated in detail than has been schematically illustrated but such manufacturing details would detract from the clarity of understanding believed provided by the schematic treatment and, moreover, will be apparent to those skilled in the art.

From the foregoing, it will be seen that the present invention provides a servoactuator incorporating a complete servo system in which mechanical feedback means are provided which are operatively associated with an hydraulic servomotor or actuator for automatically converting the amount of movement of the movable element of such motor from a predetermined position into a feedback counteracting force influencing flow restricting means and causing the movement of said movable element to responsively eliminate any differential between opposed hydraulic forces which control the flow of fluid to and from said motor and thereby hydraulically balance said movable element in a position displaced from its said predetermined position.

The present invention is applicable to electrically operated valves handling not only hydraulic liquid but other fluids, such as compressed air or hot gases.

The embodiments described are illustrative only and not limitative of the invention the scope of which is to be measured by the appended claims.

What is claimed is:

1. In a servoactuator, the combination comprising a movable piston, electrically operated valve means arranged to control the flow of fluid and operatively associated with said piston and including an electrical force motor section and a pressure regulator member, said section including electromagnetic means having spaced pole pieces forming a gap therebetween, said member having an armature part extending through said air gap and subject to a force applied across said gap and proportionately responsive to an electrical current input to said electromagnetic means, and force feedback means operatively interposed between said member and piston and responsive to movement of said piston and including a movable cam face positioned in response to movement of said piston, a cam follower operatively engaging said cam face and including a spring carrier arranged cross wise of the extended end of said armature part and having spring seats remote from said end, a first feedback spring arranged on one side of said armtaure part and operatively interposed between one of said seats and said end, a second feedback spring arranged on the opposite side of said armature part and operatively interposed between the other of said seats and said end and means biasing said cam follower into constant engagement with said cam face.

2. In a servoactuator, the combination comprising a body formed to provide a cylindrical chamber portion and a second chamber portion, a piston slidably arranged in said second chamber portion, electrically operated valve means arranged to control the flow of fluid and operatively associated with said piston and including a movable pressure regulator member to which a force is applied in proportionate response to an electrical current input to said valve means, and mechanical feedback means arranged to apply to said member a force proportionate to the extent of displacement of said piston and opposed to the first-mentioned force, said feedback means including a cam spool slidably arranged in said cylindrical chamber portion and connected to said piston and having cylindrical end portions and an intermediate frusto-conical portion, a cam follower operatively engaging said frusto-conical portion, means biasing said cam follower into constant engagement with said cam spool and spring means operatively interposed between said member and cam follower.

3. In a servoactuator, the combination comprising a body having an elongated chamber, a piston slidably arranged in said chamber adjacent one end thereof, electrically operated valve means arranged to control the flow of fluid and operatively associated with said piston and including a movable pressure regulator member to which a force is applied in proportionate response to an electrical current input to said valve means, and mechanical feedback means arranged to apply to said member a force proportionate to the extent of displacement of said piston and opposed to the first-mentioned force, said feedback means including a cam spool slidably arranged in said chamber adjacent the other end thereof, a flexible rod interconnecting said piston and cam spool, a cam follower operatively engaging said cam spool and spring means operatively interposed between said member and cam follower.

4. In a servoactuator, the combination comprising a body having generally coaxial piston and cam chambers and a motor chamber arranged laterally of the axis of and adjacent to said cam chamber, a piston slidably arranged in said piston chamber, electrically operated valve means for controlling the flow of fluid and operatively associated with said piston and including a torque motor arranged in said motor chamber and also including a pressure regulator member having an armature part arranged in said motor chamber, said torque motor being arranged to apply a force to said armature part in proportionate response to an electrical input to said valve means, and mechanical feedback means arranged to apply to said armature part a force proportionate to the extent of displacement of said piston and opposed to the first-mentioned force, said feedback means including a cam spool slidably arranged in said cam chamber, a flexible rod interconnecting said piston and cam spool, a cam follower operatively engaging said cam spool and spring means operatively interposed between said armature part and cam follower.

5. In a servoactuator, the combination comprising means providing a piston chamber, means providing a cam chamber generally coaxial of said piston chamber, means providing a motor chamber including a wall common with said cam chamber means, said wall having an opening therein, a piston slidably arranged in said piston chamber, electrically operated valve means for controlling the flow of fluid and operatively associated with said piston and including a torque motor arranged in said motor chamber and also including a pressure regulator member having an armature part arranged in said motor chamber, said torque motor being arranged to apply a force to said armature part in proportionate response to an electrical input to said valve means, and mechanical feedback means arranged to apply to said armature part a force proportionate to the extent of displacement of said piston and opposed to the first-mentioned force, said feedback means including a cam spool slidably arranged in said cam chamber, a flexible rod interconnecting said piston and cam spool, a cam follower operatively engaging said cam spool and extending through said opening and spring means operatively interposed between said armature part and cam follower.

6. In a servoactuator, the combination comprising a body, an actuating member rectilinearly movably arranged on said body, electrically operated valve means arranged on said body for controlling the flow of fluid and operatively associated with said actuating member and including a torque motor and a pressure regulator member having an armature part, said torque motor being arranged to apply a force to said armature part in proportionate response to an electrical input to said valve means, and mechanical feedback means arranged to apply to said armature part a force proportionate to the extent of rectilinear movement of said actuating member and opposed to the first-mentioned force, said feedback means including a frusto-conical cam face supportingly guided at opposite ends on said body for rectilinear movement with said actuating member, a cam follower operatively engaging said cam face, means biasing said cam follower into constant engagement with said cam face and spring means operatively interposed between said pressure regulator member and cam follower.

7. In a servoactuator, the combination comprising a body, an actuating member rectilinearly movably arranged on said body, electrically operated valve means arranged on said body for controlling the flow of fluid and operatively associated with said actuating member and including a torque motor and a pressure regulator member having an armature part, said torque motor being arranged to apply a force to said armature part in proportionate response to an electrical input to said valve means, and mechanical feedback means arranged to apply to said armature part a force proportionate to the extent of rectilinear movement of said actuating member and opposed to the first-mentioned force, said feedback means including a frusto-conical cam face supportingly guided at opposite ends on said body for rectilinear movement with said actuating member, a cam follower operatively engaging said cam face, means biasing said cam follower into constant engagement with said cam face and spring means on opposite sides of said armature part and having their opposing ends bearing thereagainst, the other ends of said spring means being constrained to move with said cam follower.

References Cited in the file of this patent

UNITED STATES PATENTS

| | | |
|---|---|---|
| 2,020,847 | Mitereff | Nov. 12, 1935 |
| 2,241,330 | Shaw | May 6, 1941 |
| 2,500,407 | Segerstad | Mar. 14, 1950 |
| 2,706,466 | Rosenberger | Apr. 9, 1955 |
| 2,942,581 | Gaffney | June 28, 1960 |
| 2,944,526 | Jarvis | July 12, 1960 |
| 2,947,286 | Baltus et al. | Aug. 2, 1960 |
| 2,953,149 | Lynn | Sept. 20, 1960 |
| 2,995,116 | Dobbins | Aug. 8, 1961 |

FOREIGN PATENTS

| | | |
|---|---|---|
| 850,534 | France | Sept. 11, 1939 |
| 575,899 | Great Britain | Mar. 11, 1946 |